No. 769,172. PATENTED SEPT. 6, 1904.
A. S. KROTZ.
RUBBER TIRE.
APPLICATION FILED JULY 23, 1903.
NO MODEL.
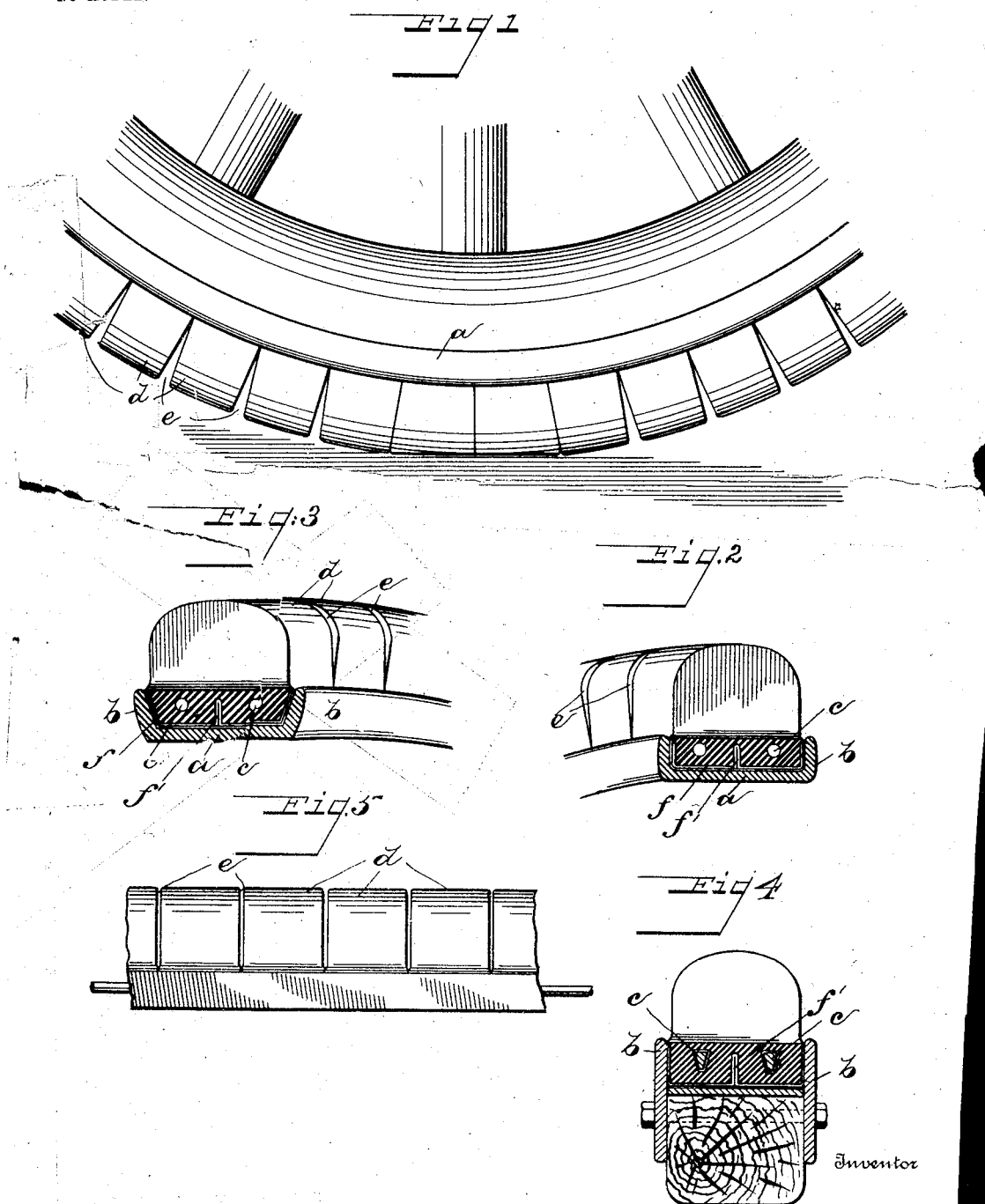

No. 769,172.

Patented September 6, 1904.

UNITED STATES PATENT OFFICE.

ALVARO SILAS KROTZ, OF SPRINGFIELD, OHIO.

RUBBER TIRE.

SPECIFICATION forming part of Letters Patent No. 769,172, dated September 6, 1904.

Application filed July 23, 1903. Serial No. 166,776. (No model.)

*To all whom it may concern:*

Be it known that I, ALVARO SILAS KROTZ, a citizen of the United States, residing at Springfield, in the county of Clark and State of Ohio, have invented certain new and useful Improvements in Rubber Tires, of which the following is a specification.

My invention relates to improvements in rubber tires for road-vehicles and especially automobiles.

My invention consists in the construction and combination of parts hereinafter described, and set forth in the claims.

The object of my invention is to provide a rubber tire having a metallic supporting seat or channel and firmly held in place thereon, which tire shall be in its nature sectional and adapted to compensate for various shocks and strains which come upon a tire of this kind and provide for taking care of such shocks without unduly taxing or displacing the rubber. I attain these objects by the construction shown in the accompanying drawings, in which—

Figure 1 is a side view of a portion of a wheel to which my improved tire is shown attached and illustrating also some of the effects of the tire in use. Figs. 2, 3, and 4 are transverse sectional views, Figs. 2 and 3 being shown partially in perspective. Fig. 5 is a side view of a piece of rubber as taken from the mold and before being curved around the wheel.

Like parts are represented by similar letters of reference in the several views.

It has been found in practice that tires formed of a single or continuous strip have a tendency when loaded to crowd over the sides of the retaining-channel, and, further, when the wheel is in action under load the rubber will have a tendency to creep or move longitudinally in the channel. Both of these conditions are more or less detrimental and cause tearing and chafing of the rubber around its supports and both result from the fact that rubber has little or no compressibility and when pressed at one point will swell out at another point.

I provide a tire which is seated in a channel *a*, the sides of which are marked *b b* and which may be of any suitable shape. Fig. 2 indicates parallel sides, Fig. 3 the standard or usual flaring channel, and Fig. 4 indicates removable parallel sides. The rubber is held in place by endless bands *c c* and formed in sections *d* by a series of narrow notches or slits *e*, which assume a slightly V shape when the rubber is placed on the wheel, as shown in Fig. 1, or if the rubber is molded endless or curved the notches can either be made as shown in Fig. 1 or Fig. 5. The sections *d* are made of about the same or less length than width, so as to flow more freely longitudinally than sidewise, and the working surfaces of the sections *d* are made comparatively wide—in fact, the sides may be parallel and as wide or nearly as wide as the base. To further stiffen the base, an extra layer of canvas *f* may be provided, which passes into the rubber and between the wires at *f'*. In Fig. 4 the bands *c c* are made V-shaped and tightly covered with canvas tape before being molded in the rubber, and the base or part between the sides *b b* is made wide, so as to be compressed against the angle sides of *c c* when the sides *b b* are drawn to place, thus drawing the rubber tightly into its seat. The interval of space between sections or the separating of the tread into short sections prevents the rubber being forced over the channel sides by providing a place for the rubber to flow into freely and individually. This permits the making of the exposed portion and tread of the rubber as wide or nearly as wide as the base and without interfering with the resiliency of the tire, and the load capacity is increased, inasmuch as the tread is wider and the sections yield or flow together as the jar or shock is increased.

It has been found in practice that a sectional tire with sections of a much greater length than width wear off rounding at their ends, leaving the center high, and thereby destroy the usefulness of the tire, as the long sections would cut over the channel at their centers and the turning of the wheel rolls the sections into use, thus acting to an extent like a continuous tire. With short and comparatively wide sections they act like a series of steps, coming into service practically their full length at once. With my improved tire the sections wear off evenly. This is also one of the results of making the notches or slits very narrow.

I have shown the rubber band molded in one piece; but the short sections can be made separately and placed on the retaining-wire as such, in which case the base of the sections should be some longer than the tread, as the base must act as a continuous band and the ends or joints held firmly together, while the sections might touch, but should not be under compression when in their normal state. The retaining wires or bands may also be located adjacent to the channel sides and set on or in a recess in the side of the rubber, or any other method of retaining can be used.

Having described my invention, what I claim as new, and desire to secure by Letters Patent, is—

1. The combination of a metallic rim or channel with parallel removable sides and a rubber band held within said channel by independent V-shaped retaining-bands, said rubber bands being formed in sections of about the same length as width by narrow slits, the base of said rubber band forming a continuous strip through which the said retaining-bands pass, substantially as and for the purpose specified.

2. The combination of a metallic channel and short rubber sections held within said channel by independent retaining-wires, the unexposed part of said sections forming a continuous band, the exposed part of said sections being slightly separated, and a canvas strip in or on the base of said sections and extending into the rubber and between the said retaining-wires, substantially as and for the purpose specified.

3. The combination of a metallic channel with parallel removable sides, a rubber band held within said channel by V-shaped independent retaining-bands, the exposed part of said rubber formed in short sections, the base or unexposed part of said rubber band having a wider base than the space between the said removable parallel sides, substantially as and for the purpose specified.

4. In a vehicle-tire, the combination of a metallic channel, a rubber tire seated therein, said tire consisting of a continuous base portion fitted into said channel and a tread portion formed into short sections by transverse notches extending through the same, means for holding said tire in said channel, which means coöperate wholly with said base portion, whereby the independent sections of the tread portion are adapted to be pushed together without any intervening devices and form under pressure a substantially continuous tread, substantially as specified.

5. In a vehicle-tire, the combination of a metallic channel, a rubber tire seated therein and formed with a base portion fitted into said channel so as to fill the same, the tread portion being divided into sections by transverse V-shaped openings extending through the same, and means for securing said base portion to said channel, leaving said sections free to cushion together under pressure and to close said openings, substantially as specified.

6. In a vehicle-tire, the combination with a metallic channel, of a rubber tire formed with a continuous base and a sectional tread, said sections and base being integrally united and said sections being divided from each other by transverse slits adapted to close under pressure, and means applied wholly to said base for securing said tire in said channel, whereby the sections are adapted to cushion together under pressure, substantially as specified.

7. In a vehicle-tire, the combination of a metallic channel, a rubber tire seated therein, said tire consisting of a base portion seated in said channel and held therein by retaining-wires which pass through said base portion, and a tread portion formed in sections by transverse slits, said sections being integrally secured to said base at the bottom but otherwise free and independent, and narrow transverse slits between said sections adapted to be closed under pressure, substantially as specified.

8. In a vehicle-tire, the combination with a metallic channel, of a rubber tire formed with a continuous base and a sectional tread, said sections being of less length than width and being divided from each other by transverse slits adapted to close under pressure, said sections being further integrally secured to said base at the bottom but otherwise free and independent, and the slits between said sections being adapted to be closed under pressure.

In testimony whereof I have hereunto set my hand this 20th day of July, A. D. 1903.

ALVARO SILAS KROTZ.

Witnesses:
 CHAS. I. WELCH,
 FRANK L. WALKER.